(12) United States Patent
Oestergaard

(10) Patent No.: US 9,366,237 B2
(45) Date of Patent: Jun. 14, 2016

(54) SEGMENTED JACKET CONSTRUCTION, IN PARTICULAR FOR A FOUNDATION FOR A WIND TURBINE INSTALLATION

(75) Inventor: Thomas Oestergaard, Kolding (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 13/697,605

(22) PCT Filed: Aug. 9, 2010

(86) PCT No.: PCT/EP2010/061558
§ 371 (c)(1),
(2), (4) Date: Jan. 22, 2013

(87) PCT Pub. No.: WO2011/147472
PCT Pub. Date: Dec. 1, 2011

(65) Prior Publication Data
US 2013/0202447 A1    Aug. 8, 2013

(30) Foreign Application Priority Data

May 25, 2010 (EP) .................................... 10163759

(51) Int. Cl.
| | |
|---|---|
| *E02D 5/54* | (2006.01) |
| *F03D 11/04* | (2006.01) |
| *E04B 1/24* | (2006.01) |
| *E04B 1/58* | (2006.01) |

(52) U.S. Cl.
CPC ............ *F03D 11/045* (2013.01); *E04B 1/2403* (2013.01); *E04B 1/585* (2013.01)

(58) Field of Classification Search
CPC ...... F03D 11/045; E04B 1/2403; E04B 1/585
USPC .......... 52/167.3, 653.1, 651.01, 652.1, 648.1, 52/655.1, 698, 745.04
See application file for complete search history.

(56) References Cited

U.S. PATENT DOCUMENTS

| | | | | |
|---|---|---|---|---|
| 1,798,858 | A | * | 3/1931 | Watt .............................. 405/239 |
| 2,288,576 | A | * | 6/1942 | Titcomb et al. ................ 405/251 |
| 2,322,587 | A | * | 6/1943 | Payne ......................... 285/285.1 |
| 2,359,755 | A | * | 10/1944 | Fischer ........................... 249/83 |
| 2,693,222 | A | * | 11/1954 | Krupp ............................. 269/52 |
| 2,775,095 | A | * | 12/1956 | Lobenthal ............... E02B 17/00 175/9 |
| 2,893,521 | A | | 7/1959 | Wheeler |
| 2,933,898 | A | * | 4/1960 | Upson ........................ 405/195.1 |

(Continued)

FOREIGN PATENT DOCUMENTS

| | | |
|---|---|---|
| CN | 101016887 A | 8/2007 |
| CN | 101384781 A | 3/2009 |

(Continued)

OTHER PUBLICATIONS

GB 367218 A Bromford Tube Co. Ltd Feb. 18, 1932.*

(Continued)

*Primary Examiner* — Jeanette E Chapman

(57) ABSTRACT

A segmented jacket construction is proposed. The segmented jacket construction is for a foundation for a wind turbine installation. The segmented jacket construction has at least two grid segments, which are connected to each other by joints. The joint has two tubular jacket modules, which are bonded by a grouting material.

13 Claims, 4 Drawing Sheets

(56) References Cited

U.S. PATENT DOCUMENTS

| | | | |
|---|---|---|---|
| 3,168,604 A * | 2/1965 | Kramer | B29D 23/18 |
| | | | 264/294 |
| 3,276,929 A * | 10/1966 | Ferch | B29C 61/003 |
| | | | 156/158 |
| 3,304,581 A * | 2/1967 | Kramer | B29D 23/18 |
| | | | 425/392 |
| 3,540,224 A * | 11/1970 | Pogonowski | 405/227 |
| 3,791,154 A * | 2/1974 | Crain | 405/225 |
| 3,920,268 A * | 11/1975 | Stewing | B29C 65/42 |
| | | | 138/155 |
| 5,039,256 A * | 8/1991 | Gagliano | 405/244 |
| 5,385,432 A | 1/1995 | Kiyomiya | |
| 5,536,117 A * | 7/1996 | Frame et al. | 405/202 |
| 5,775,846 A * | 7/1998 | Blandford | E02B 17/0004 |
| | | | 405/227 |
| 6,536,991 B1 * | 3/2003 | Trader et al. | 405/216 |
| 7,055,866 B2 * | 6/2006 | Tempas | 285/148.23 |
| 7,350,584 B2 * | 4/2008 | Simpson | E21B 17/22 |
| | | | 166/207 |
| 7,562,865 B2 * | 7/2009 | Penning | 256/65.14 |
| 2006/0185279 A1 * | 8/2006 | Eusterbarkey | 52/292 |
| 2012/0263544 A1 * | 10/2012 | Oestergaard et al. | 405/224 |

FOREIGN PATENT DOCUMENTS

| | | |
|---|---|---|
| CN | 101476536 A | 7/2009 |
| DE | 19805653 A1 | 8/1999 |
| EP | 2067914 A2 | 6/2009 |
| EP | 2067915 A2 | 6/2009 |
| JP | 10160039 A * | 6/1998 |
| WO | WO 2005005752 A1 | 1/2005 |
| WO | WO 2006005323 A1 | 1/2006 |

OTHER PUBLICATIONS

GB 317836 A Shojiro Takechi Apr. 3, 1930.*

* cited by examiner

SEGMENTED JACKET CONSTRUCTION, IN PARTICULAR FOR A FOUNDATION FOR A WIND TURBINE INSTALLATION

CROSS REFERENCE TO RELATED APPLICATIONS

This application is the US National Stage of International Application No. PCT/EP2010/061558 filed Aug. 9, 2010 and claims the benefit thereof. The International Application claims the benefits of European application No. 10163759.3 filed May 25, 2010, both of the applications are incorporated by reference herein in their entirety.

FIELD OF THE INVENTION

The present invention relates to a segmented jacket construction, in particular for a foundation for a wind turbine installation, comprising at least two grid segments, which are connected to each other by joints.

BACKGROUND OF THE INVENTION

In existent offshore wind turbine installations different foundations are common: Monopile foundations consist of a steel pile which is driven into the seabed. Gravity foundations consist of a large base constructed from either concrete or steel or a combination, which rests on the seabed. The wind turbine is dependent on gravity to remain erect. Tripod foundations consist of three legs comprising piles on each end which are driven into the seabed. This type is generally used at deeper depths.

Furthermore jacket structures have been used for offshore wind turbine installations. Traditionally the jacket structure is a steel structure where all parts are welded as three dimensional connections at central connection joints. It is advantageous that the jacket structure is a relative low-cost structure, it is easy to construct and has a high stiffness-to-material use ratio. Furthermore it is efficient in positions with high wave loads.

In EP 2 067 914 A2 a jacket structure is disclosed, where the jacket is built of a number of types interconnected by means of casted independent central nodes. The pipes and casted nodes are welded together. However, it is difficult to transport large jacket structures to a proposed construction site, therefore jacket structures are prefabricated as modules, which are welded together at the installation place. On the other hand it is difficult to weld a large number of connections at the construction site with the necessary quality.

SUMMARY OF THE INVENTION

It is therefore an object of the present invention to provide a segmented jacket construction, where each module can be manufactured on-shore so that the pre manufactured modules can be joined on an installation site.

According to the present invention this object is achieved in the above defined segmented jacket construction in that a joint comprises two tubular jacket modules, which are bonded by a grouting material.

The present invention is based on the idea that large foundations for a wind turbine installation can be installed efficiently by using a number of segmented jacket constructions as modules which are pre manufactured on-shore, e. g. indoor in a plant, transported to the installation site and connected at joints by grouted connections. It is advantageous that no welding connections have to be carried out at the installation site, instead only grouted connections of tubular jacket modules, which are interconnected, are needed.

In the inventive segmented jacket construction it is preferred that two tubular jacket modules are inserted into each other, whereby a radial space between them is filled with the grouting material. The grouting material is ring-shaped and connects a first tubular jacket module with a second tubular jacket module.

According to a further development of the inventive segmented jacket construction a first tubular jacket module comprises inner protrusions supporting a second tubular jacket module. The first tubular jacket module has a larger diameter than the second tubular jacket module, which can be inserted in the first tubular jacket module. In the connected state the front of the second tubular jacket module contacts the protrusions so that the relative position of the two tubular jacket modules is fixed.

Preferably several inner protrusions are provided, which may be formed as support knees. The support knees may be positioned in circumferential direction, whereby the protrusions are spaced from each other.

According to the concept of the invention the two tubular jacket modules may form a butt joint, which is covered by a tubular transition piece, whereby a radial space between the butt joint and the tubular transition piece is filled with grouting material. The two tubular jacket modules according to this embodiment have the same diameter so that a tubular transition piece can be positioned over the butt joint. The radial space between the butt joint and the tubular transition piece is filled with grouting material which ensures a connection between the transition piece and the two tubular jacket modules.

According to an alternative of the inventive segmented jacket construction the joint can be covered by a sleeve. Similar to the transition piece the sleeve covers the end portions of two tubular jacket modules, which may have the same diameter, in order to form a butt joint. Alternatively two tubular jacket modules can be used which have a different diameter so that one tubular jacket module is inserted into the other tubular jacket module. Basically the sleeve serves to hold the grouting material at its place.

The sleeve of the inventive segmented jacket construction may comprise a profiled inner surface. The profile of the inner surface enlarges the contact surface between the sleeve and the grouting material so that it can withstand higher loads.

The inventive segmented jacket construction may comprise a sleeve with an inlet for injecting the grouting material which facilitates the injection of the grouting material into the sleeve. Preferably the inlet is formed at the lower side of the sleeve so that grouting material is injected from bottom to top so that air-pockets are avoided.

In the inventive segmented jacket construction the two connected tubular jacket modules may be angulate.

Further the invention relates to a foundation for a wind turbine installation. The inventive foundation for a wind turbine installation comprises a segmented jacket construction as described before.

BRIEF DESCRIPTION OF THE DRAWINGS

The invention and its underlaying principle will be better understood when consideration is given to the following detailed description of preferred embodiments. In the accompanying drawings.

DETAILED DESCRIPTION OF THE INVENTION

Figure 1:
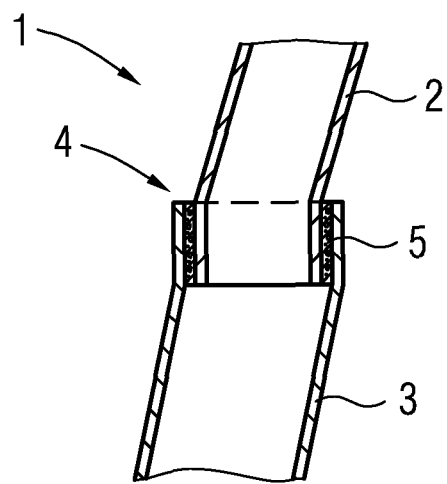
FIG. 1 is a sectional view of a detail of a first embodiment of an inventive segmented jacket construction.

FIG. 1 shows a detail of a segmented jacket construction 1 for a foundation for a wind turbine installation. A first jacket module 2 is connected to a second jacket module 3 at a joint 4 by grouting material 5. As can be seen in FIG. 1 the end sections of the first jacket module 2 and the second jacket module 3 are angulate. The second jacket module 3 has a larger diameter than the first jacket module 2 so that the first jacket module 2 can be inserted into the second jacket module 3. Between the first and second jacket module 2, 3 a circular space is provided which is filled with a grouting material. On a foundation installation site several segmented jacket constructions 1 are positioned such that they fit into each other, subsequently a grouting material 5 is injected in order to fill the space between the jacket modules and to establish a connection.

Figure 2:
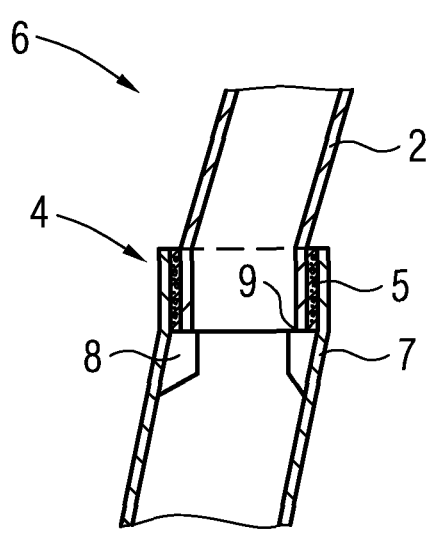
FIG. 2 is a sectional view of a detail of a second embodiment of an inventive segmented jacket construction.

FIG. 2 shows another embodiment of a segmented jacket construction 6, whereby the same reference numbers are used for the same components. A first jacket module 2 and a second jacket module 7 are inserted such that they fit into each other. On the inner side of the second jacket module 7 a number of protrusions 8 are provided which are formed as support knees. The support knees, which are positioned in circumferential direction, form a support for a front portion 9 of the first jacket module 2. The protrusions 8 guarantee that both jacket modules 2, 7 are connected correctly. A space between the jacket modules 2, 7 is filled with grouting material 5 so that a joint 4 is formed. Longitudinal forces are transferred from the first jacket module 2 to the second jacket module 7 through the joint 4 via both the grouting material 5 and the physical connection at the protrusion 8, which serves as support knees.

Figure 3:
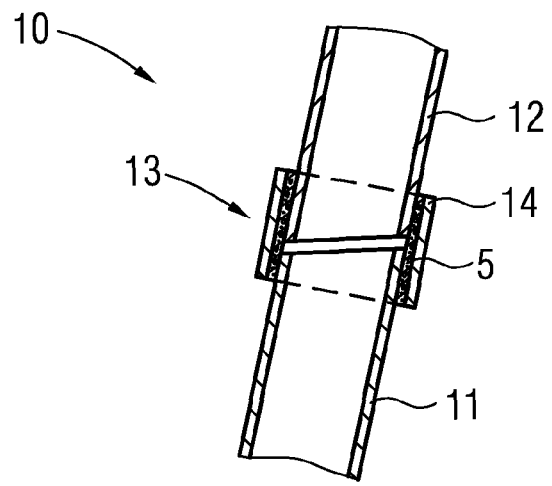
FIG. 3 is a sectional view of a detail of a third embodiment of an inventive segmented jacket construction.

FIG. 3 shows another embodiment of a segmented jacket construction 10, whereby a first jacket module 11 is connected to a second jacket module 12. The tubular jacket modules 11, 12 form a butt joint 13, which is covered by a transition piece 14. Basically the transition piece 14 is a tube with a larger diameter than the first and second jacket module 11, 12. A space between the butt joint 13 and the transition piece 14 is filled with grouting material 5.

Figure 4:
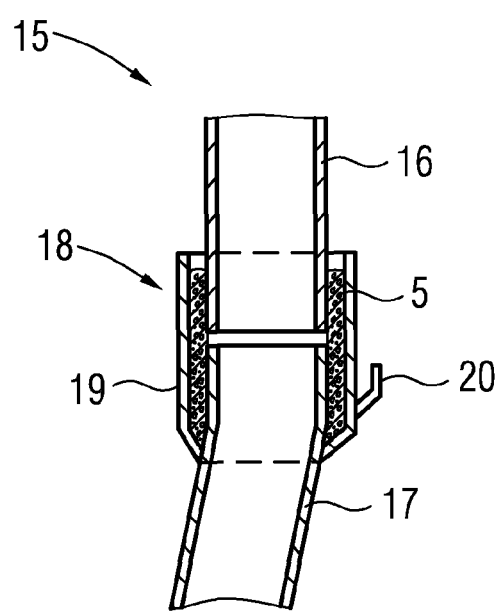
FIG. 4 is a sectional view of a detail of a fourth embodiment of an inventive segmented jacket construction.

FIG. 4 shows another embodiment of a segmented jacket construction 15, whereby a first jacket module 16 and a second jacket module 17 are connected by a joint 18. The jacket modules 16, 17 form a butt joint, which is covered by a sleeve 19. The function of the sleeve 19 is to hold the grouting material 5 which encases the butt joint. The lower part of the sleeve 19 has a smaller diameter so that the sleeve 19 contacts the outer surface of the second jacket module 17. Consequently the grouting material 5 is secured at its position until it is hardened. In order to facilitate injection of the grouting material 5 an inlet 20 is provided at the lower side of the sleeve 19. The viscous grouting material 5 is injected through the inlet 20 and reaches the upper end of the sleeve 19 whereby the risk of air-pockets in the grouting material 5 is minimized. This intern ensures that the strength of the joint 18 is maximized.

Figure 5:
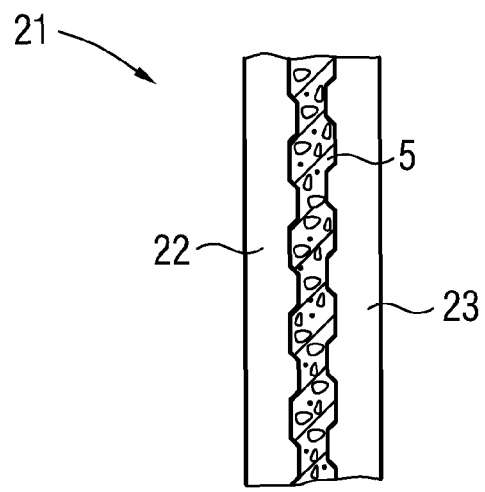
FIG. 5 is a sectional view of a detail of a jacket module.
Figure 5A:
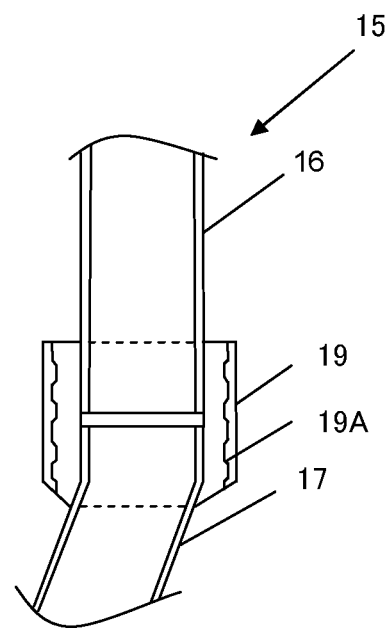
FIG. 5A is a sectional view of a further detail of a jacket module.

FIG. 5 shows a detail of a joint of a segmented jacket construction. The joint 21 comprises a first jacket module 22, a second jacket module 23 with a space between them, which is filled with grouting material 5. The first and second jacket module 22, 23 have a profiled surface 24, 25 with protrusions and recesses. Thereby the contact surface between grouting material 5 and the first and second jacket module 22, 23 is enlarged so that the joint 21 is able to withstand higher loads. In other embodiments a sleeve with a profiled surface may be envisaged. FIG. 5A shows a detail of a joint of a segmented jacket construction 15 as illustrated in FIG. 4 with first jacket module 16 and second jacket module 17. The sleeve 19 of the segmented jacket construction comprises a profiled inner surface 19a. The profile of the inner surface 19a enlarges the contact surface between the sleeve 19 and the grouting material (see FIG. 4).

Figure 6:
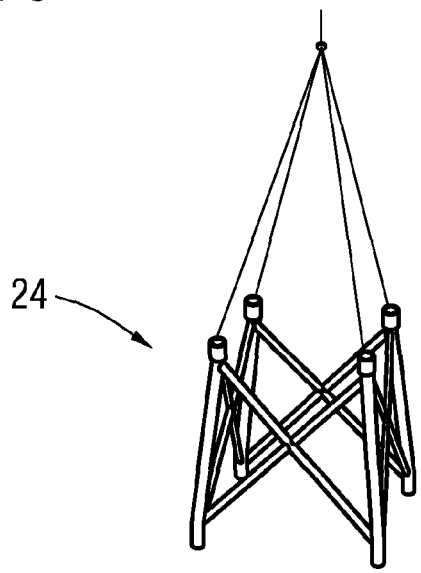
FIG. 6 shows the installation of an inventive segmented jacket construction.
Figure 6:
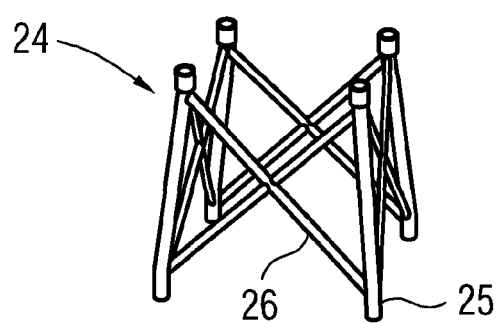

FIG. 6 shows an example of a segmented jacket construction. A module 24 of a segmented jacket construction comprises a number of jacket modules which are formed as vertically oriented legs 25. Two vertically oriented legs 25 are connected with each other by cross-members 26, so that a framework or grid is formed. The upper end of the legs 25 is an open tube so that a joint can be formed by inserting a lower end of another module and injecting grouting material into the joint. The assembly of two segmented jacket construction modules 24 is schematically shown in FIG. 6. The modules 24 are premanufactured on-shore in a plant and then stored for final assembly. The foundation comprises a number of prefabricated grid segments or modules.

In the modules 24 the vertically oriented legs 25, the joints and/or the cross-members (cross-pipes) are made of steel or cement based composite materials. The jackets can be totally made of concrete, as an alternative the jackets can be partially made of concrete such as with concrete legs and steel cross-members.

The invention claimed is:

1. A segmented jacket construction, comprising:
a joint; and
at least two grid segments connected to each other by the joint,
wherein the joint comprises two tubular jacket modules,
wherein the two tubular jacket modules are bonded by a grouting material,
wherein a first tubular jacket module of the two tubular jacket modules comprises a larger diameter than a second tubular jacket module of the two tubular jacket modules, the second tubular jacket module being inserted into the first tubular jacket module,
wherein a circular space between the first and second jacket modules is filled with the grouting material,
wherein the two tubular jacket modules are angulate,
wherein the joint is covered by a sleeve, and
wherein an inner surface of the sleeve is profiled.

2. The segmented jacket construction according to claim 1, wherein a first tubular jacket module of the two tubular jacket modules comprises an inner protrusion to support a second tubular jacket module of the two tubular jacket modules.

3. The segmented jacket construction according to claim 2, wherein a plurality of inner protrusions are provided as support knees.

4. The segmented jacket construction according to claim 1, wherein the sleeve comprises an inlet for injecting the grouting material.

5. The segmented jacket construction according to claim 1, wherein an inner surface of the two tubular jacket modules is profiled.

6. The segmented jacket construction according to claim 1, wherein the segmented jacket construction is for a foundation for a wind turbine installation.

7. A foundation for a wind turbine installation, comprising: a segmented jacket construction according to claim 1.

8. A segmented jacket construction, comprising:
a joint; and
at least two grid segments connected to each other by the joint,
wherein the joint comprises two tubular jacket modules, and
wherein the two tubular jacket modules are bonded by a grouting material,
wherein the joint is covered by a sleeve,
wherein the sleeve comprises an inlet for injecting the grouting material, and
wherein an inner surface of the sleeve is profiled.

9. The segmented jacket construction according to claim 8, wherein a first tubular jacket module of the two tubular jacket modules comprises an inner protrusion to support a second tubular jacket module of the two tubular jacket modules.

10. The segmented jacket construction according to claim 9, wherein a plurality of inner protrusions are provided as support knees.

11. The segmented jacket construction according to claim 8, wherein an inner surface of the two tubular jacket modules is profiled.

12. The segmented jacket construction according to claim 8, wherein the two tubular jacket modules are angulate.

13. The segmented jacket construction according to claim 8, wherein the segmented jacket construction is for a foundation for a wind turbine installation.

* * * * *